(12) United States Patent
Choi

(10) Patent No.: US 6,959,012 B2
(45) Date of Patent: Oct. 25, 2005

(54) APPARATUS FOR COMPENSATING FOR PHASE DIFFERENCE ATTENDANT UPON TIME DIVISION MULTIPLEXING AND METHOD THEREOF

(75) Inventor: Jong-youn Choi, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 847 days.

(21) Appl. No.: 09/897,731

(22) Filed: Jul. 3, 2001

(65) Prior Publication Data

US 2002/0105975 A1 Aug. 8, 2002

(30) Foreign Application Priority Data

Feb. 8, 2001 (KR) .................................. 2001-6121

(51) Int. Cl.[7] .............................. H04J 3/06; H04J 3/04
(52) U.S. Cl. ....................... 370/509; 370/516; 370/535
(58) Field of Search ................................ 370/442, 458, 370/498, 503, 508, 516–519, 537, 535, 509

(56) References Cited

U.S. PATENT DOCUMENTS

| | | | |
|---|---|---|---|
| 5,050,167 A | * 9/1991 | Izadpanah | 370/516 |
| 5,208,545 A | * 5/1993 | Schweitzer, III | 341/123 |
| 5,517,493 A | * 5/1996 | Uekama et al. | 370/516 |
| 5,528,609 A | * 6/1996 | Asano | 370/516 |
| 5,534,828 A | * 7/1996 | Okada et al. | 332/103 |
| 5,768,311 A | * 6/1998 | Betts et al. | 375/222 |
| 5,903,569 A | * 5/1999 | Fujisaki | 370/538 |
| 6,636,570 B1 | * 10/2003 | Choi et al. | 375/332 |

FOREIGN PATENT DOCUMENTS

| | | |
|---|---|---|
| CN | 1260092 A | 7/2000 |
| EP | 0989706 A1 | 3/2000 |
| KR | 1999-0063251 | 7/1999 |
| KR | 2000-0070122 | 11/2000 |
| WO | WO 9857470 | 12/1998 |

* cited by examiner

*Primary Examiner*—Andy Lee
(74) *Attorney, Agent, or Firm*—Sughrue Mion, PLLC

(57) ABSTRACT

An apparatus and method is provided for compensating for the difference between the phase relation among signals at the point of generation and the phase relation among the signals after time division multiplexing when the signals are processed according to the time division multiplexing. In a system which transmits a plurality of signals according to the time division multiplexing, the apparatus includes a phase transition filter group having as many phase transition filters as the plurality of signals. Each of the phase transition filters performs filtering to generate a signal having a phase transited with respect to an input signal based on phase information. The apparatus also includes a multiplexing unit for providing phase information, which are assigned to each of the plurality of signals according to the time division multiplexing, to the phase transition filter group and time division multiplexing a plurality of signals transmitted from the phase transition filter group. Accordingly, the phase relation among the plurality of signals at the point of generation is the same as the phase relation among corresponding signals obtained after the time division multiplexing.

9 Claims, 6 Drawing Sheets

APPARATUS FOR COMPENSATING FOR PHASE DIFFERENCE ATTENDANT UPON TIME DIVISION MULTIPLEXING AND METHOD THEREOF

BACKGROUND OF THE INVENTION

1. Field of the Invention

The present invention relates to the technical field of processing a signal according to a time division multiplex mode, and more particularly, to an apparatus and method for compensating for the difference between the phase of each signal at the point of generation and the phase of each signal after time division multiplexing.

2. Description of the Related Art

In a time division multiplex mode, as widely known, a plurality of input signals are sequentially arranged in the time domain without being superposed when they are transmitted. Such a time division multiplex mode is applied to a variety of electronic equipment to reduce complexity in hardware and to reduce the price of the system.

For example, when it is necessary to convert a plurality of digital signals into analog signals, hardware can be configured such that separate digital-to-analog (D/A) converters can be provided for the individual digital signals. However, in this case, the hardware becomes complex, and the price of the system increases.

When a time division multiplexing unit is provided prior to a D/A converter, a plurality of digital signals can be converted into analog signals using only one D/A converter. In other words, the time division multiplexing unit allocates the plurality of digital signals based on the time domain and sequentially supplies the allocated signals to the D/A converter so that analog signals corresponding to the plurality of digital signals can be obtained using only one D/A converter.

FIG. 1 shows an example of an apparatus including a time division multiplexing unit and a single D/A converter, as described above. FIG. 2 shows an example of data flow for explaining the operations of the apparatus of FIG. 1. Signal processing according to conventional time division multiplexing will now be described with reference to FIGS. 1 and 2.

When digital signals A (A0, A1, A2, A3, . . . ), B (B0, B1, B2, B3, . . . ) and C (C0, C1, C2, C3, . . . ) are transmitted from first through third digital signal generation logic units 101, 102 and 103 in a digital signal generation logic unit group 100 to a multiplexing unit 110, the multiplexing unit 110 allocates the input signals based on a time domain according to a control signal from a controller 120 in the form of A0, B0, C0, A1, B1, C1, . . . , as shown in FIG. 2. Subsequently, the multiplexing unit 110 outputs the signals. The control signal contains arrangement information indicating the order in which the signals inputted to the multiplexing unit 110 are selected, and information indicating the delay time for each input signal.

For example, in the case of selecting and transmitting the digital signals A, B and C, input to the multiplexing unit 110 in that order, the arrangement information designates a selection order so that the digital signal A can be selected in the first place, the digital signal B can be selected in the second place, and the digital signal C can be selected in the third place. When the next digital signal is transmitted the delay time is the standby duration of the next digital signal. Accordingly, when the digital signals A, B and C are transmitted in that order, a delay time applied to the digital signal B is different from the delay time applied to the digital signal C. In other words, the delay time for the digital signal C is longer than the delay time for the digital signal B. When the delay time is determined, the operation conditions of the multiplexing unit 110, the D/A converter 130 and the first through third sampling and holding units 141–143 are considered.

The D/A converter 130 converts the digital signal which has been multiplexed and transmitted, as shown in FIG. 2, into an analog signal and transmits the analog signal to the first through third sampling and holding units 141–143 at the same time. Each of the first through third sampling & holding units 141–143 samples and holds certain portions of the input signal, as shown in FIG. 2, in response to a corresponding "sample-hold" signal which is generated by the multiplexing unit 110 during the time division multiplexing. In other words, the first sampling and holding unit 141 samples and holds the signals A0, A1, A2, A3, . . . converted into an analog signal. The second sampling and holding unit 142 samples and holds the signals B0, B1, B2, B3, . . . converted into an analog signal. The third sampling and holding unit 143 samples and holds the signals C0, C1, C2, C3, . . . converted into an analog signal.

The signals sampled and held by the first through third sampling and holding units 141–143 are transmitted to first through third low-pass filters (LPFs) 151–153, respectively. Each of the first through third LPFs 151–153 removes a high frequency component from the input signal. Delay times, which have been applied for time division multiplexing performed by the multiplexing unit 110, are maintained in outputs 2 and 3 from the second and third LPFs 152 and 153, as shown in FIG. 2.

As described above, due to phase delays according to time division multiplexing, the phase relation among digital signals at the point of generation is different to that among the digital signals after time division multiplexing. Accordingly, an error occurs as a result of using the outputs 1, 2 and 3 from the first through third LPFs 151–153.

For example, in the case of a projection television, a total of 6 control signals are horizontally and vertically used for R, G and B signals to control convergence. When these control signals are provided according to time division multiplexing, as shown in FIG. 1, delay effects according to the time division multiplexing exist in the control signals. Accordingly, the phase relation among the R, G and B signals at the point of generation is different from that among the R, G and B signals after the time division multiplex, and a horizontal phase is different to a vertical phase, thereby disturbing convergence.

SUMMARY OF THE INVENTION

To solve the above problems, it is an object of the present invention to provide an apparatus and method for compensating for the difference between the phase relation among the signals at the point of generation and the phase relation among the signals after time division multiplexing when the signals are processed according to the time division multiplexing.

Accordingly, to achieve the above object of the invention, an embodiment of the present invention provides an apparatus for compensating for a phase difference in a system which transmits a plurality of signals according to time division multiplexing. The apparatus includes a phase transition filter group and a multiplexing unit. The phase transition filter group includes as many phase transition filters as there are signals. Each of the phase transition filters performs filtering to generate a signal having a phase altered with respect to an input signal based on phase information.

The multiplexing unit provides phase information to the phase transition filter group and it time division multiplexes a plurality of signals transmitted from the phase transition filter group. The phase information is assigned to each of the plurality of signals according to the time division multiplexing.

A further embodiment provides a method for compensating for a phase difference in a system which transmits a plurality of signals according to time division multiplexing. The method includes the steps of generating a selection signal for the time division multiplexing of the plurality of signals, generating predetermined phase information for each of the signals to be selected by the selection signal, performing phase transition on each of the signals and outputting the result when it is determined that the signal needs to be subjected to the phase transition based on the predetermined phase information and outputting each of the signals in its present state when it is determined that the signal does not need to be subjected to the phase transition based on the predetermined phase information, and time division multiplexing the signal or signals which have been subjected to the phase transition and the signal or signals which have not been subjected to the phase transition and transmitting a time division multiplexed signal.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PRESENT INVENTION

Figure 3:
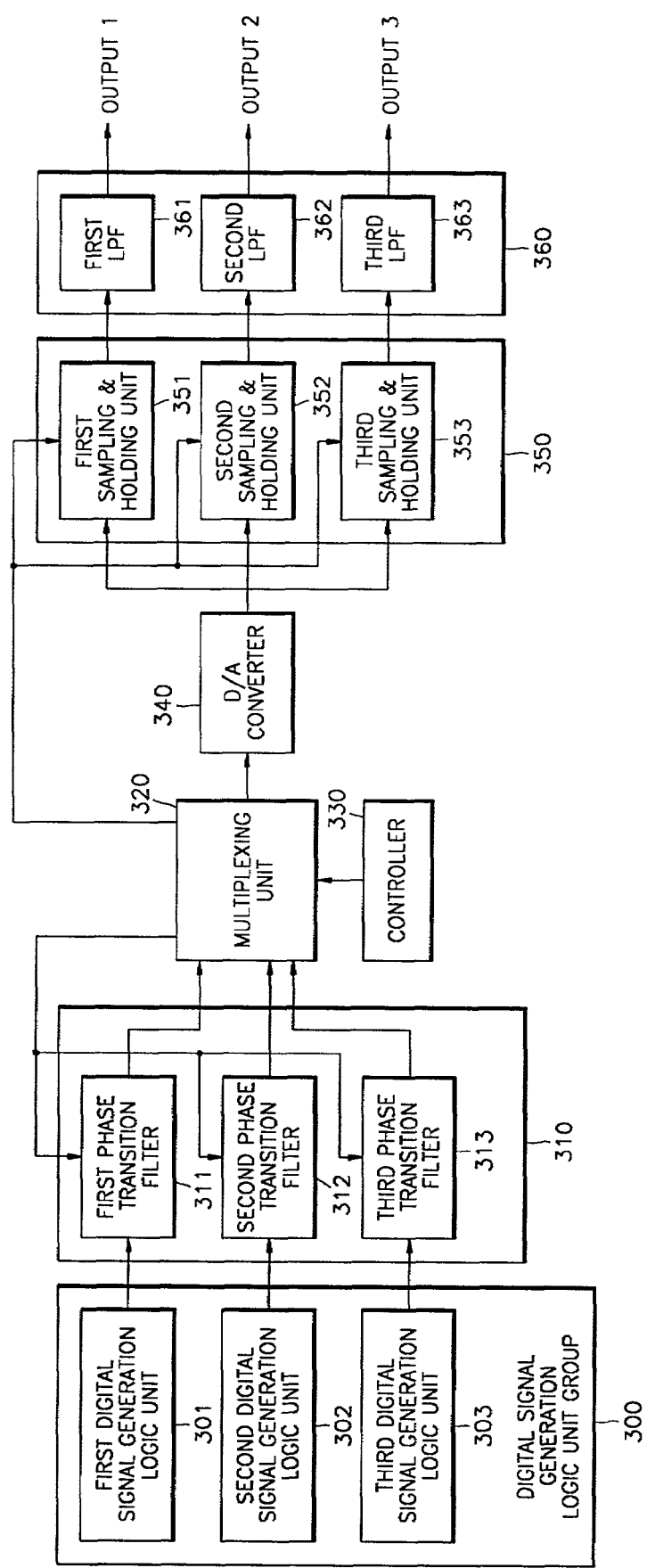
FIG. 3 is a diagram illustrating an embodiment of an apparatus according to the present invention.

Hereinafter, an embodiment of the present invention will be described in detail with reference to the attached drawings. Referring to FIG. 3, an apparatus according to the present invention includes a digital signal generation logic unit group 300, a phase transition filter group 310, a multiplexing unit 320, a controller 330, a digital-to-analog (D/A) converter 340, a sampling and holding unit group 350 and a low-pass filter (LPF) group 360.

Figure 4:
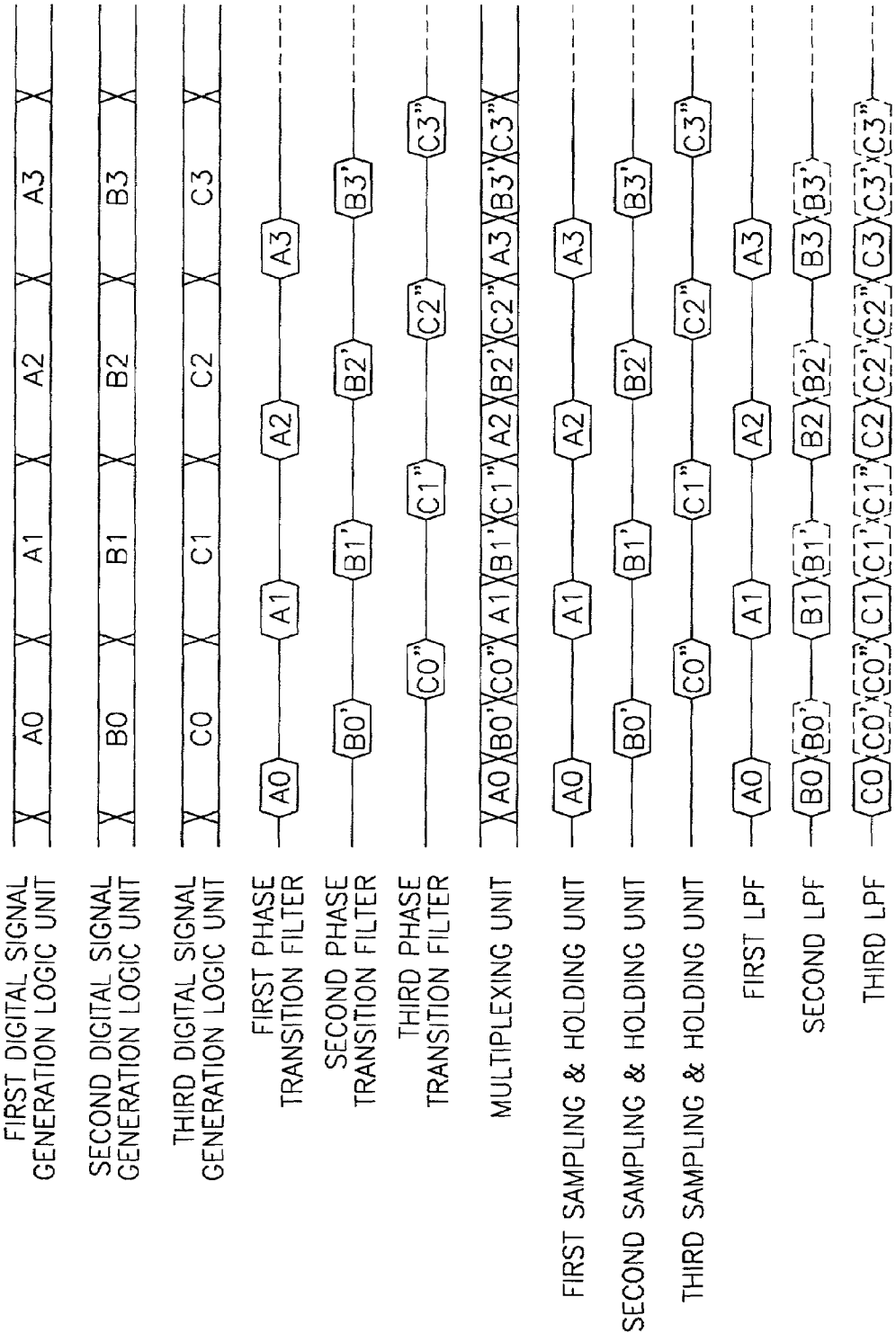
FIG. 4 is a diagram illustrating an example of a data flow for explaining the operation of the apparatus of FIG. 3.

The digital signal generation logic unit group 300 is composed of first through third digital signal generation logic units 301–303 which generate three different digital signals A, B and C, respectively. Each of the first through third digital signal generation logic units 301–303 can be configured such that it generates a predetermined digital signal in response to a signal received from the outside. Hereinafter, it is assumed that the first through third digital signal generation logic units 301–303 generate the three digital signals having data flow, as shown in FIG. 4. The three digital signals are transmitted to the phase transition filter group 310.

The phase transition filter group 310 is composed of first through third phase transition filters 311–313 which may or may not perform phase transition on each of the digital signals transmitted from the digital signal generation logic unit group 300 depending on the phase information allocated to the corresponding digital signal. In other words, when it is determined that a digital signal generated by the first digital signal generation logic unit 301 needs to be subjected to phase transition based on phase information allocated to the signal, the first phase transition filter 311 performs filtering to generate a digital signal whose phase has been altered based on the phase information. When it is determined that a digital signal generated by the second digital signal generation logic unit 302 needs to be subjected to phase transition based on phase information allocated to the signal, the second phase transition filter 312 performs filtering to generate a digital signal whose phase has been altered based on the phase information. When it is determined that a digital signal generated by the third digital signal generation logic unit 303 needs to be subjected to phase transition based on phase information allocated to the signal, the third phase transition filter 313 performs filtering to generate a digital signal whose phase has been altered base on the phase information.

Referring to FIG. 4, the digital signal A applied to the first phase transition filter 311 does not need phase transition so that the first phase transition filter 311 outputs digital signals A0, A1, A2 and A3 having its original phase. The second phase transition filter 312 outputs digital signals B0', B1', B2' and B3' having altered phases with respect to the digital signal B. The third phase transition filter 313 outputs digital signals C0", C1", C2" and C3" having altered phases with respect to the digital signal C. The amount of phase transition for each of the digital signals B and C is determined by phase information provided by the multiplexing unit 320.

Figure 5:
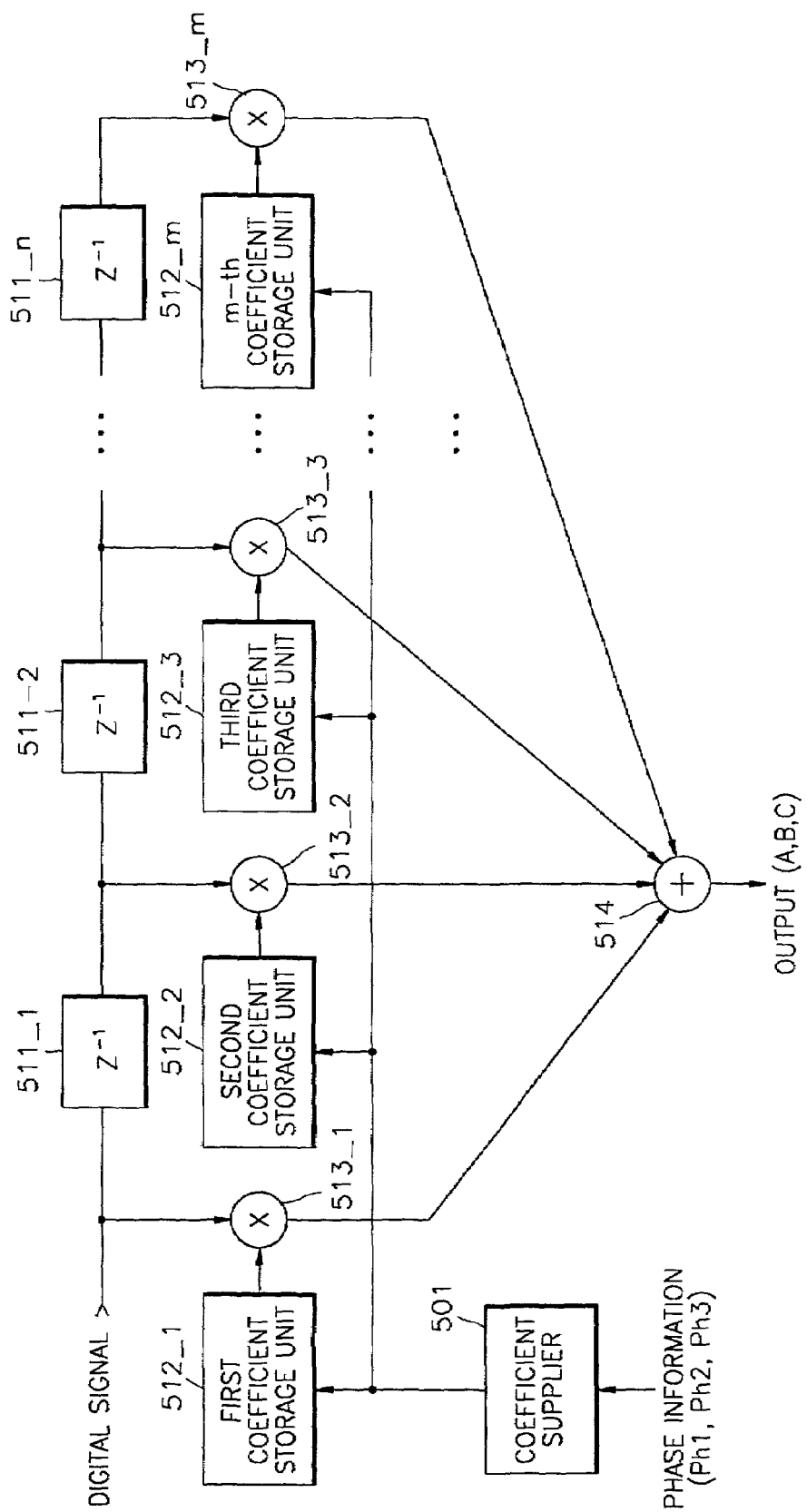
FIG. 5 is a detailed diagram illustrating the phase transition filter of FIG. 3.

To perform phase transition on an input digital signal, each of the first through third phase transition filters 311–313 is configured, as shown in FIG. 5. Referring to FIG. 5, each of the first through third phase transition filters 311–313 includes a plurality of delay units 511_1–511_n connected in series for delaying the input digital signal, first through m-th coefficient storage units 512_1–512_m for storing the coefficients of the filter, a multiplier 513_1 for multiplying the currently input digital signal by a coefficient supplied by the first coefficient storage unit 512_1, a plurality of multipliers 513_2–513_m for multiplying digital signals output from the delay units 511_1–511_n by coefficients supplied by the coefficient storage units 512_2–512_m, respectively, an adder 514 for adding signals output from the multipliers 513_1–513_m, and a coefficient supplier 501 for supplying the coefficient of a corresponding filter tap to each of the first through m-th coefficient storage units 512_1–512_m.

The number of the delay units 511_1–511_n is one less than the number of taps of the filter (that is, the number of taps–1). The number of first through m-th coefficient storage units 512_1–512_m and the number of multipliers 513_1–512_m are the same as the number of taps of the filter. Each of the first through m-th coefficient storage units 512_1–512_m stores information on a single coefficient supplied from the coefficient supplier 501.

The coefficient supplier 501 is configured as a table which is assigned as many filter coefficients as the number of filter taps for each piece of phase information. For example, when the coefficient supplier 501 is configured to have three pieces of phase information, since the m filter coefficients for the m filter taps are assigned for each of the three pieces of phase information, the coefficient supplier 501 has a structure for storing 3×m filter coefficients. If there are 16 pieces of phase information, the coefficient supplier 501 has a structure for storing 16×m filter coefficients.

Accordingly, when the digital signals A0, A1, A2 and A3 which are not subjected to phase transition, as shown in FIG. 4, are output from the first phase transition filter 311, coefficients assigned to an area corresponding to phase information having a value of 0 in the coefficient supplier 501 are supplied to the respective first through m-th coefficient storage units 512_1–512_m for the respective filter taps.

When the digital signals B0', B1', B2' and B3' which are subjected to phase transition, as shown in FIG. 4, are output from the second phase transition filter 312, and when three pieces of phase information exist, coefficients assigned to an area corresponding to phase information having a value of 1 in the coefficient supplier 501 are supplied to the respective first through m-th coefficient storage units 512_1–512_m. Here, instead of a value of 1, the phase information may have any values other than 0. For example, when the coefficient supplier 501 is configured to store filter tap coefficients with respect to 16 pieces of phase information, and when the value of phase information currently applied is 5, the second phase transition filter 312 provides filter tap coefficients assigned to phase information having a value of 5 to the respective first through m-th coefficient storage units 512_1–512_m thereby outputting digital signals B0', B1', B2' and B3', as shown in FIG. 4.

Like the second phase transition filter 312, the third phase transition filter 313 outputs the digital signals C0", C1", C2" and C3", with the exception that the third phase transition filter 313 should perform a greater degree of phase transition on digital signals compared to the second phase transition filter 312. Accordingly, when the coefficient supplier 501 is configured to store filter tap coefficients with respect to three pieces of phase information, as described above, filter tap coefficients assigned to an area corresponding to phase information having a value of 3 are supplied to the first through m-th coefficient storage units 513_1–513_m, respectively, thereby generating digital signals which have been subjected to phase transition. When the coefficient supplier 501 is configured to store filter tap coefficients with respect to 16 pieces of phase information, as described above, and when the value of phase information currently applied is 10, the third phase transition filter 313 provides filter tap coefficients assigned to phase information having a value of 10 to the respective first through m-th coefficient storage units 512_1–512_m, thereby outputting digital signals C0", C1", C2" and C3", as shown in FIG. 4. Each of the first through third phase transition filters 311–313 can be realized as a polyphase filter.

In response to a control signal provided by the controller 330, the multiplexing unit 320 generates the phase information assigned to each of the plurality of digital signals according to time division multiplexing and generates a sample hold signal for controlling the sampling and holding of the sampling and holding unit group 350. The multiplexing unit 320 time division multiplexes the digital signals A, B and C transmitted from the phase transition filter group 310 to output a signal as shown in FIG. 4. That is, the multiplexing unit 320 outputs a digital signal in an order such as A0, B0', C0", A1, B1', C1", A2, B3', C3", and so on.

Figure 1:
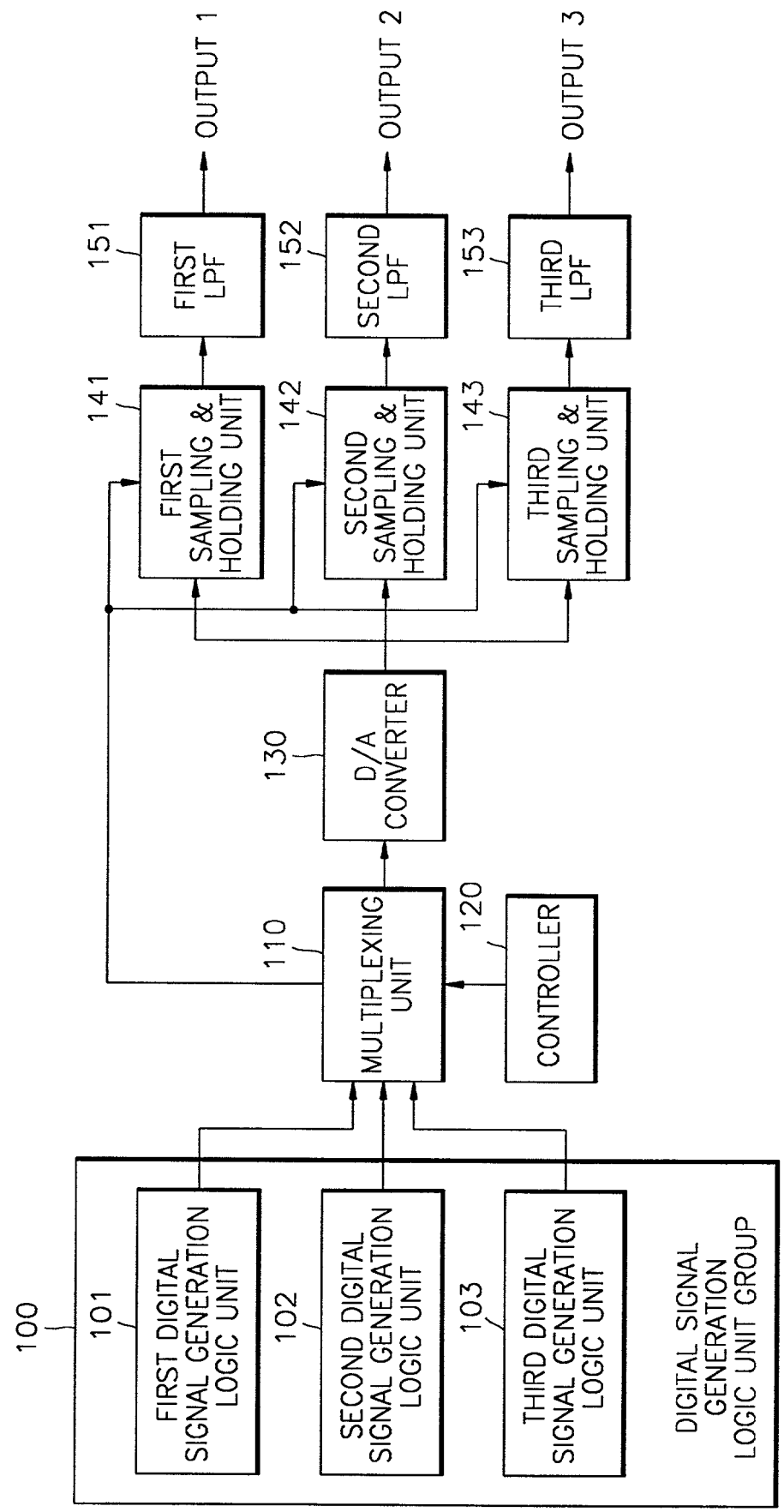
FIG. 1 is a diagram illustrating an example of a conventional apparatus having a time division multiplexing function.
Figure 2:
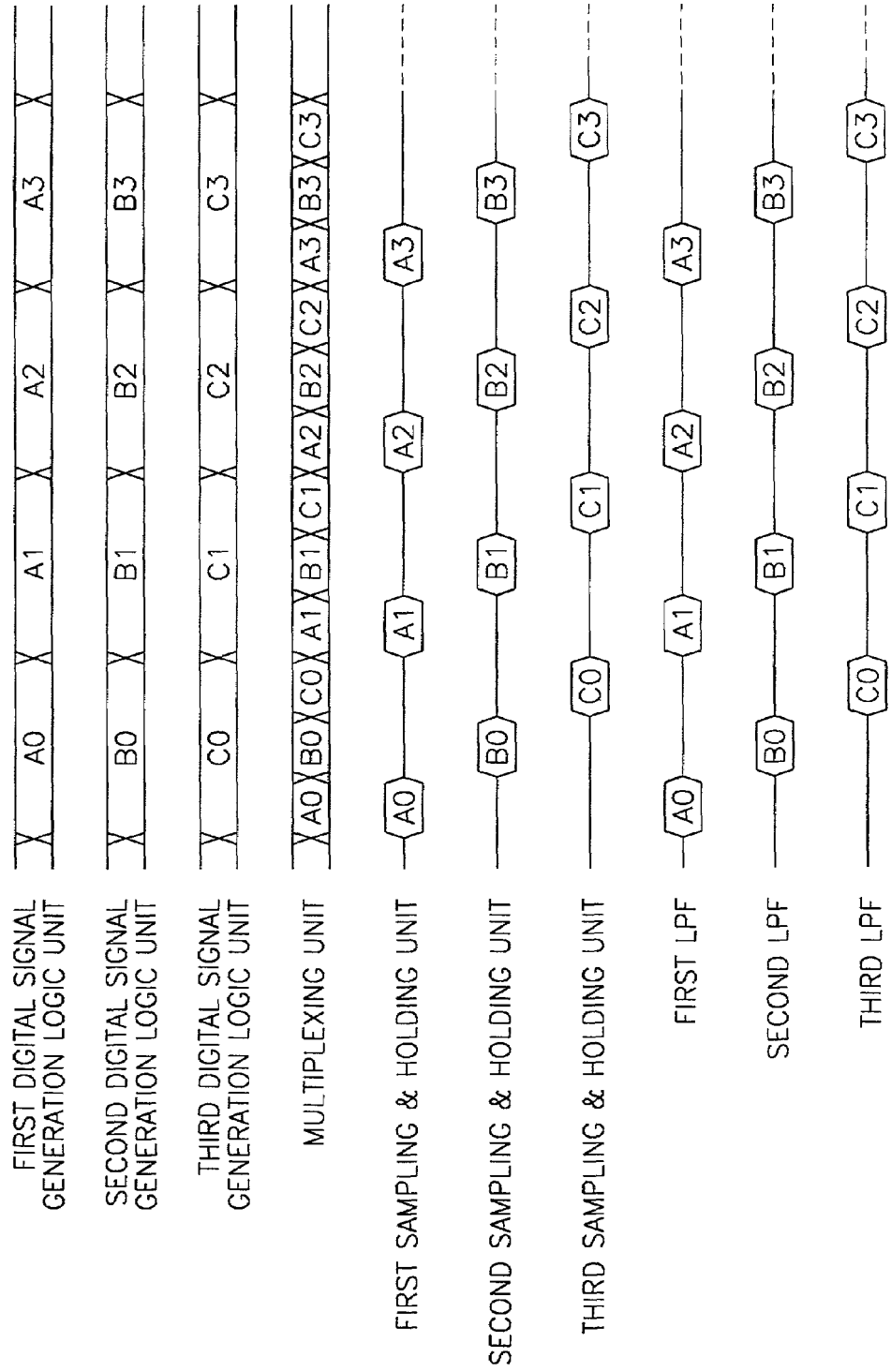
FIG. 2 is a diagram illustrating an example of a data flow for explaining the operation of the apparatus of FIG. 1.

The controller 330 provides the control signal to the multiplexing unit 320 to control time division multiplexing. The control signal contains arrangement information of a plurality of input digital signals and delay information for each of the digital signals, for the time division multiplexing, as described in FIG. 1. The phase information for each digital signal is predetermined based on the delay information.

Figure 6:
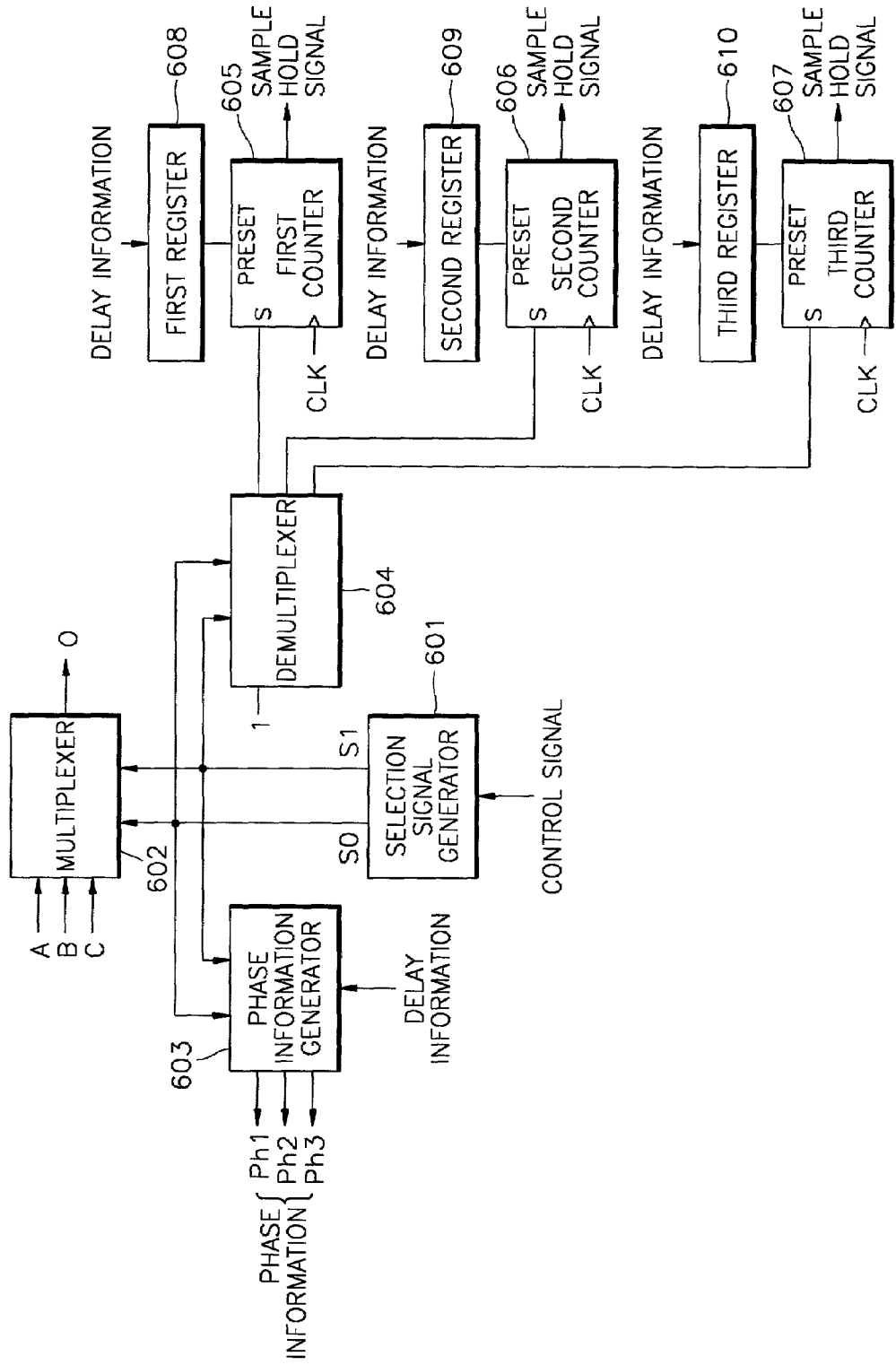
FIG. 6 is a detailed diagram illustrating the multiplexing unit of FIG. 3.

As shown in FIG. 6, the multiplexing unit 320 includes a selection signal generator 601, a multiplexer 602, a phase information generator 603, a demultiplexer 604, first through third counters 605–607 and first through third registers 608–610.

The selection signal generator 601 generates selection signals for controlling the selection operation of the multiplexer 602, in response to the control signal provided from the controller 330. In this embodiment, since the multiplexer 602 selectively outputs the three digital signals A, B and C, the selection signal generator 601 is configured to generate a selection signal of two bits, S0 and S1.

The selection signal is generated considering the arrangement information contained in the control signal and the relations among signals input to the multiplexer 602 through input terminals. The point in time that the selection signal is generated is determined depending on delay information assigned to each of the digital signals. For example, when it is assumed that the multiplexer 602 selects and outputs the digital signal A if the selection signal of two bits S0 and S1 is generated as "00", the multiplexer 602 selects and outputs the digital signal B if the selection signal of two bits S0 and S1 is generated as "01", and the multiplexer 602 selects and outputs the digital signal C if the selection signal of two bits S0 and S1 is generated as "10", the state of the selection signal provided to the multiplexer 602 varies with delay information assigned to each of the digital signals A, B and C. In other words, the point in time when the selection signal of two bits S0 and S1 changes from "00" into "01" depends on delay information assigned to the digital signal B. An example in which the selection signal is composed of 2 bits is described because three digital signals are managed in this embodiment, but the selection signal can be modified to be suitable for the number of signals to be multiplexed.

Once receiving the digital signal A which has not been subjected to phase transition and the digital signals B and C which have been subjected to phase transition from the respective first through third phase transition filters 311–313, the multiplexer 602 functions as a transmitter which divides the digital signals A, B and C based on a time domain and transmits the result signal. Accordingly, the digital signals A, B and C are output from the multiplexer 602 in the order of A0, B0', C0", A1, B1', C", A2, B2', C2", and so on, as shown in FIG. 4.

The phase information generator 603 generates phase information assigned to each of the digital signals A, B and C in response to the selection signal output from the selection signal generator 601. In other words, the phase information generator 603, which previously stores phase information on each of the digital signals A, B and C, outputs phase information Ph1 assigned to the signal A to the first phase transition filter 311 when the selection signal of two bits S0 and S1 is received as "00". The phase information generator 603 outputs phase information Ph2 assigned to the signal B to the second phase transition filter 312 when the selection signal of two bits S0 and S1 is received as "01". The phase information generator 603 outputs phase information Ph3 assigned to the signal C to the third phase transition filter 313 when the selection signal of two bits S0 and S1 is received as "10".

Here, when delay information for delaying the phase information located in the phase information generator 603 is set, the phase information generator 603 generates the phase information. This phase information is delayed by an amount corresponding to the set delay information and outputs the result phase information to a corresponding one among the first through third phase transition filters 311–313. For example, when the delay information is set to 1, and when the phase information assigned to the digital signals A, B and C are set to 0, 5 and 10, respectively, in the phase information generator 603, the phase information generator 603 generates the phase information Ph1, Ph2 and Ph3 as 1, 6 and 11, respectively.

The demultiplexer 604 transmits "1" set at its input terminal to one of the first through third counters 605–607 in response to the selection signal of two bits S0 and S1. For example, when the bits S0 and S1 are "00", the demultiplexer 604 demultiplexes "1" to the first counter 605. Then, the first counter 605 performs counting in synchronization with a clock signal. For each counting operation the first counter 605 compares a count value with a value provided from the first register 608. The value provided from the first register 608 is delay information assigned to the digital signal A during the time division multiplex. The delay information is contained in the control signal provided from the controller 330. As a result of the comparison, if the value provided from the first register 608 is the same as the count value, the first counter 605 outputs a sample hold signal in an active state.

Each of the second and third counters 606 and 607 operates in the same manner as the first counter 605. When the bits S0 and S1 of the selection signal are "01", the second counter 606 performs counting. When the bits S0 and S1 of the selection signal are "10", the third counter 607 performs counting. The second register 609 stores delay information on the signal B, and the third register 610 stores delay information on the signal C.

Sample hold signals output from the first through third counters 605–607 are transmitted to the sampling and holding unit group 350. In other words, a sample hold signal output from the first counter 605 is transmitted to a first sampling and holding unit 351. A sample hold signal output from the second counter 606 is transmitted to a second sampling and holding unit 352. A sample hold signal output from the third counter 607 is transmitted to a third sampling and holding unit 353.

The D/A converter 340 converts the digital signals A, B and C which have been time division multiplexed by the multiplexing unit 320 into analog signals and transmits the analog signals to the sampling & holding unit group 350.

The sampling and holding unit group 350 is composed of the first through third sampling and holding units 351–353. Each of the first through third sampling and holding units 351–353 samples and holds a corresponding signal among the analog signals transmitted from the D/A converter 340. In other words, each of the first through third sampling and holding units 351–353 samples and holds an analog signal which is received while an input sample hold signal from the multiplexer 320 is in an active state.

The first sampling and holding unit 351 samples and holds an analog signal corresponding to the digital signal A and outputs the resultant analog signal, as shown in FIG. 4. The second sampling and holding unit 352 samples and holds an analog signal corresponding to the digital signal B and outputs the resultant analog signal, as shown in FIG. 4. The third sampling and holding unit 353 samples and holds an analog signal corresponding to the digital signal C and outputs the resultant analog signal, as shown in FIG. 4. The sampled and held signals output from the first through third sampling and holding units 351–353 are transmitted to LPFs 361–363, respectively, in the LPF group 360. In other words, the signal output from the first sampling and holding unit 351 is transmitted to the first LPF 361. The signal output from the second sampling and holding unit 352 is transmitted to the second LPF 362. The signal output from the third sampling and holding unit 353 is transmitted to the third LPF 363.

Each of the first through third LPFs 361–363 in the LPF group 360 removes a high frequency component from an input analog signal. Here, due to a low-pass filtering characteristic, analog values corresponding to respective B0 and C0 are output at the time when an analog value corresponding to A0 is output. Accordingly, the phase relation among the three digital signals A, B and C at the point of generation is the same as the phase relation among the outputs 1, 2 and 3.

In the above embodiment, only three digital signals are managed, but an apparatus for managing N digital signals can be embodied based on the above embodiment. In addition, when a time division multiplexing method according to the present invention is applied to the generation of convergence control signals in a projection television, as mentioned in the description of conventional art, a difference in phase relation can be compensated for such that the phase relation among R, G, B, horizontal and vertical signals at the point of generation is the same as the phase relation among corresponding signals obtained after time division multiplexing. More specifically, since 6 signals are required to control convergence in a projection television, when 6 digital signal generation logic units are provided in the digital signal generation logic unit group 300, and as many members as can correspond to the 6 digital signal generation logic units are provided in each of the phase transition filter group 310, the sampling & holding unit group 350 and the LPF group 360, the same result as described above can be obtained.

In a method according to the present invention, a selection signal is generated for the time division multiplex of a plurality of digital signals in the multiplexing unit 320, in response to a control signal provided from the controller 330. In addition, predetermined phase information for a signal selected according to the selection signal is generated. The predetermined phase information has been described in the description of the phase information generator 604 of FIG. 6. When it is determined that an input digital signal needs to be subjected to phase transition based on the predetermined phase information, a corresponding phase transition filter provided in the phase transition filter group 310 generates a signal whose phase is altered. When it is determined that an input digital signal does not need to be subjected to phase transition based on the predetermined phase information, a corresponding phase transition filter presents the input digital signal with alteration. Thereafter, a digital signal which has not been subjected to phase transition and digital signals which have been subjected to phase transition are time division multiplexed by the multiplexing unit 320.

According to the present invention, the difference between the phase relation among the signals at the point of generation and the phase relation among the signals after time division multiplexing, which occurs due to a phase delay effect attendant upon the time division multiplexing, can be compensated for, thereby preventing the occurrence of an error caused by a difference in phase relation. For example, when the present invention is applied to the generation of signals for controlling the convergence of a projection television, the phase relation among the signals at the point of generation is the same as the phase relation among the signals obtained after time division multiplex, thereby preventing disturbance in convergence.

What is claimed is:

1. An apparatus for compensating for a phase difference in a system which transmits a plurality of signals according to time division multiplexing, the apparatus comprising:
   a phase transition filter group comprising a number of phase transition filters equal to the number of the plurality of signals, where based on phase information each of said phase transition filters performs filtering to generate a signal having a phase altered with respect to an input signal; and
   a multiplexing unit operable to provide the phase information and for time division multiplexing the plurality of signals transmitted from the phase transition filter group, where the phase information is assigned to each of the plurality of signals according to the time division multiplexing and to the phase transition filter group.

2. The apparatus of claim 1, wherein each of said phase transition filters, comprises:
   a plurality of delay units operable to delay the input signal;
   a plurality of coefficient storage units operable to store coefficients;
   a first multiplier operable to multiply a current input signal by a first coefficient supplied by a first coefficient storage unit;
   second multipliers operable to multiply signals output from the delay units by respective coefficients supplied by second through mth coefficient storage units;
   an adder operable to add signals output from the first and second multipliers; and
   a coefficient supplier operable to supply the coefficients such that a coefficient of a corresponding filter tap is supplied to first through mth coefficient storage units.

3. The apparatus of claim 1, wherein the multiplexing unit comprises:
   a transmitter for dividing the plurality of signals based on a time domain and for transmitting the divided plurality of signals;
   a selection signal generator operable to generate a selection signal for controlling a selection operation of the transmitter with respect to the plurality of signals; and
   a phase information generator operable to generate predetermined phase information in response to the selection signal from the selection signal generator and transmitting the predetermined phase information to the phase transition filter group.

4. The apparatus of claim 3 wherein the multiplexing unit further comprises:
   a counter group having a plurality of counters;
   a demultiplexer which responds to the selection signal by transmitting information to one of the counters in the counter group; and
   a register group which provides the delay information assigned to the signal during the time division multiplexing so that the delay information can be compared, by the counter group, with a count value provided from said counter group;
   each of said counters responding to the demultiplexer by performing counting and outputting a sample hold signal.

5. The apparatus of claim 3, wherein the phase information generator changes the predetermined phase information according to delay information and transmits the changed predetermined phase information to the phase transition filter group, when the delay information is set in advance.

6. The apparatus of claim 1, wherein each of the phase transition filters comprises a coefficient supplier for storing the coefficients of individual filter taps for each piece of the phase information and outputting filter tap coefficients corresponding to the received predetermined phase information, so that filtering is performed on an input signal.

7. The apparatus of claim 6, wherein the coefficient supplier is configured as a table with as many filter coefficients as the number of filter taps for each piece of phase information.

8. An apparatus for compensating for a phase in a transmitting system which time division multiplexes a plurality of digital signals and converts a result signal into an analog signal, the apparatus comprising:
   a signal generation logic unit group having a plurality of signal generation logic units, where each of the signal generation logic units generates a predetermined digital signal;
   a phase transition filter group comprising a number of phase transition filters equal to the number of the plurality of digital signals, where each of the phase transition filters performs filtering to generate a signal having a phase transited with respect to an input digital signal based on phase information;
   a multiplexing unit for providing the phase information, which is assigned to each of the plurality of digital signals according to time division multiplexing, to the phase transition filter group and time division multiplexing the plurality of digital signals transmitted from the phase transition filter group and outputting a time domain multiplexed signal;
   a controller operable to provide a control signal, comprising arrangement information of the plurality of digital signals and delay information for each of the plurality of digital signals, to the multiplexing unit in order to control the time division multiplexing;
   a digital-to-analog converter for converting the time division multiplexed digital signal output from the multiplexing unit into an analog signal;
   a sampling and holding unit group comprising a number of sampling and holding units equal to the number of the plurality of digital signals, each of the sampling and holding units operable to sample a corresponding signal from the analog signal output from the digital-to-analog converter and hold the sampled signal in response to a sample hold signal which is generated by the multiplexing unit; and
   a low-pass filter group comprising a number of low-pass filters equal to the number of sampling and holding units, the low-pass filters low-pass filtering the sampled and held signals output from the sampling and holding units and outputting analog signals having a phase relation which is the same as the phase relation among the plurality of digital signals at a point of generation.

9. A method for compensating for a phase difference in a system which transmits a plurality of signals according to time division multiplexing, the method comprising: generating a selection signal for the time division multiplexing of the plurality of signals; generating predetermined phase information for each of the signals to be selected by the selection signal;

performing phase transition on each of the signals and outputting the result when it is determined that one of the signals needs to be subjected to the phase transition based on the predetermined phase information and outputting each of the signals unchanged when it is determined that the signals do not need to be subjected to the phase transition based on the predetermined phase information; and time division multiplexing the signal or signals which have been subjected to the phase transition and the signal or signals which have not been subjected to the phase transition and transmitting a time division multiplexed signal.

* * * * *